United States Patent [19]
Aoki

[11] Patent Number: 5,940,605
[45] Date of Patent: Aug. 17, 1999

[54] SIMULATION METHOD AND SIMULATION SYSTEM

[75] Inventor: Shinobu Aoki, Tokyo, Japan

[73] Assignee: NEC Corporation, Tokyo, Japan

[21] Appl. No.: 08/659,186

[22] Filed: Jun. 6, 1996

[30] Foreign Application Priority Data

Jun. 6, 1995 [JP] Japan .................................... 7-139480

[51] Int. Cl.$^6$ ................................................ G06F 9/445
[52] U.S. Cl. ................. 395/500.47; 395/500.36; 395/381; 395/387; 395/568; 395/572; 371/22.4
[58] Field of Search .................. 364/489, 490, 364/578; 395/500, 376, 381, 387, 568, 572, 580, 183.04, 183.13, 183.14, 500.47, 500.35, 500.38, 500.36, 500.37; 371/20.4, 22.1, 22.4

[56] References Cited

U.S. PATENT DOCUMENTS

| | | | |
|---|---|---|---|
| 4,744,084 | 5/1988 | Beck et al. ................................. | 371/23 |
| 5,021,947 | 6/1991 | Campbell et al. ....................... | 364/200 |
| 5,425,036 | 6/1995 | Liu et al. ................................... | 371/23 |
| 5,450,586 | 9/1995 | Kuzara et al. .......................... | 395/700 |
| 5,488,713 | 1/1996 | Norton et al. .......................... | 395/500 |
| 5,517,637 | 5/1996 | Bruce, Jr. et al. ...................... | 395/500 |
| 5,621,651 | 4/1997 | Swoboda ................................. | 364/489 |
| 5,671,402 | 9/1997 | Nasu et al. .............................. | 395/568 |
| 5,673,425 | 9/1997 | Iwashita ................................... | 395/568 |

OTHER PUBLICATIONS

O. Feger, "Simulating, testing and troubleshooting 8051/515 microcontrollers with Simula51", *Siemens Components*, vol. 28, No. 1, Jan. 1993, pp. 13–15.

J. Chance, "Simulation experiences in the development of software for digital signal processors", *Microprocessors & Microsystems*, vol. 10, No. 8, Oct. 1986, pp. 419–426.

D. Mockridge, "SIM—An 8051 Simulator", *Elektor Electronics*, vol. 20, No. 218, Jan. 1994, pp. 10–13.

Dawson et al., "The Verilog Procedural Interface for the Verilog Hardware Description Language", IEEE, 1996, pp. 17–23.

*Primary Examiner*—Kevin J. Teska
*Assistant Examiner*—Thai Phan
*Attorney, Agent, or Firm*—Sughrue, Mion, Zinn, Macpeak & Seas, PLLC

[57] ABSTRACT

At least two test instructions are sequentially simulated. Concurrently the number of clocks taken for simulating at least two test instructions are counted. The peripheral processing program relating to at least two test instructions are simulated for the number of clocks counted after simulating at least two test instructions.

4 Claims, 7 Drawing Sheets

PRIOR ART

FIG.7

PRIOR ART

SIMULATION METHOD AND SIMULATION SYSTEM

BACKGROUND OF THE INVENTION

This invention relates to an art for simulation using in the process for developing a computer program and, more particularly, to an art for accelerating simulation processing.

Figure 5:
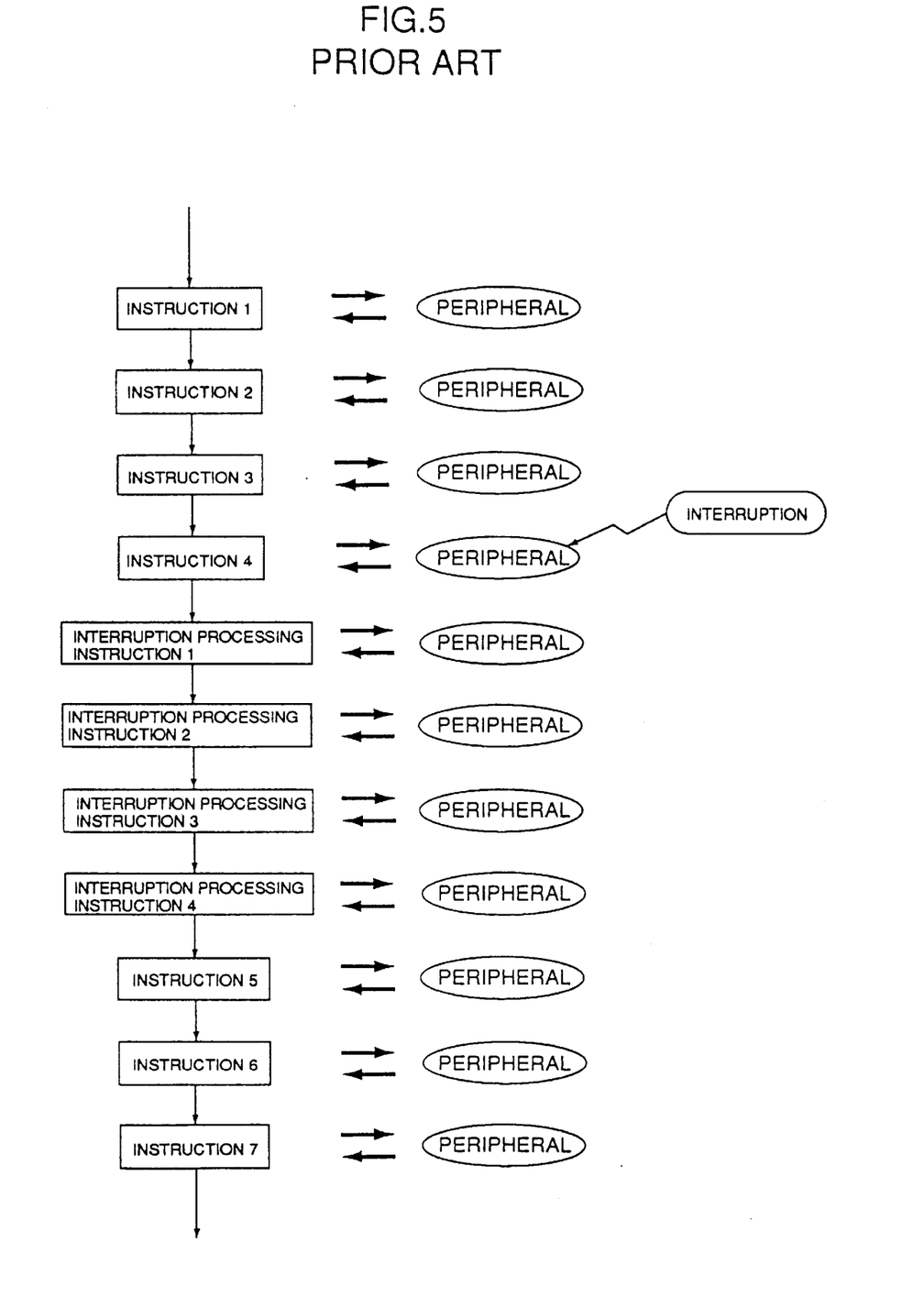
FIG. 5 is a flow chart showing a simulation method of the prior art.
Figure 6:
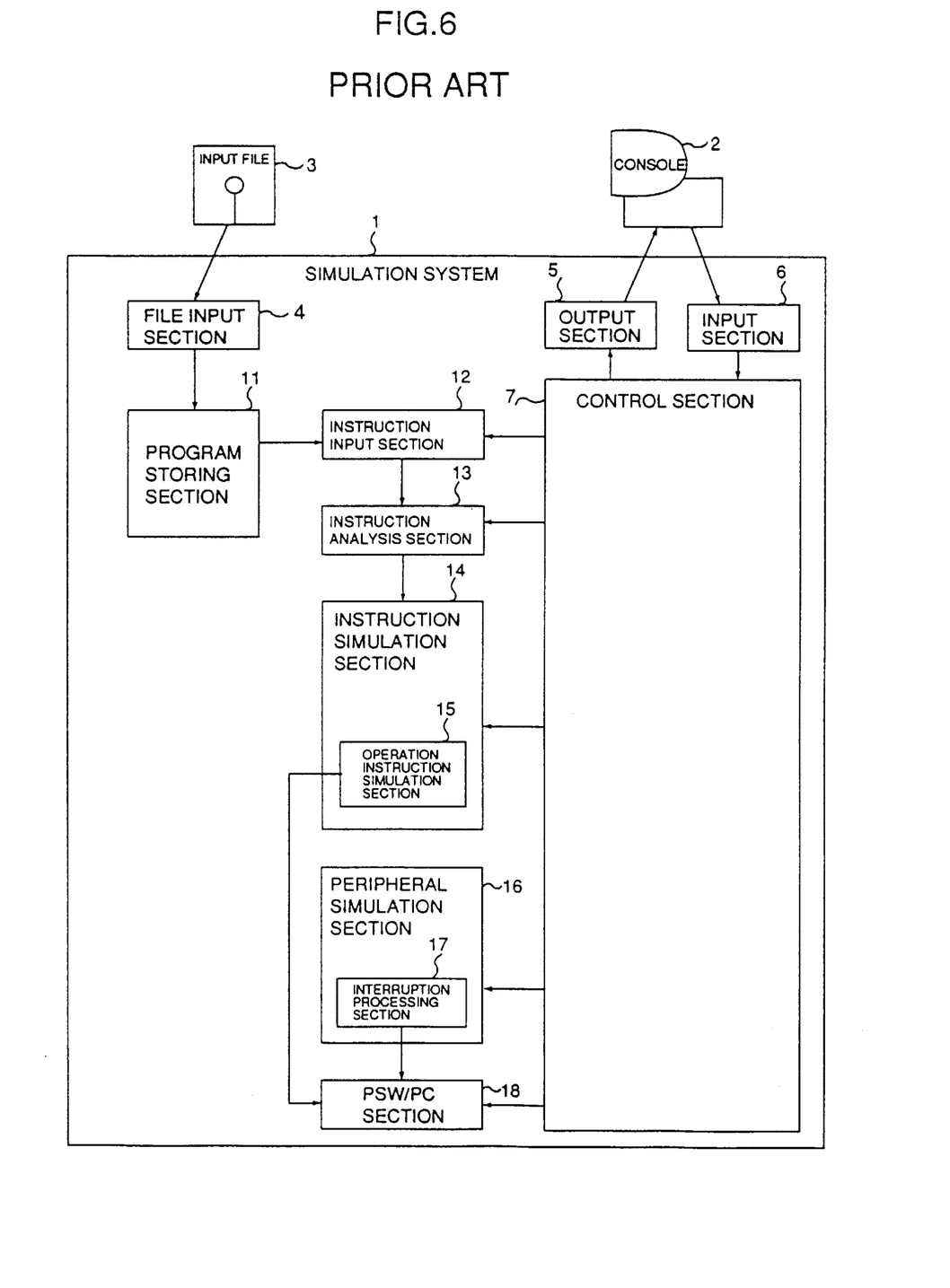
FIG. 6 is a block diagram of a system of the prior art.
Figure 7:
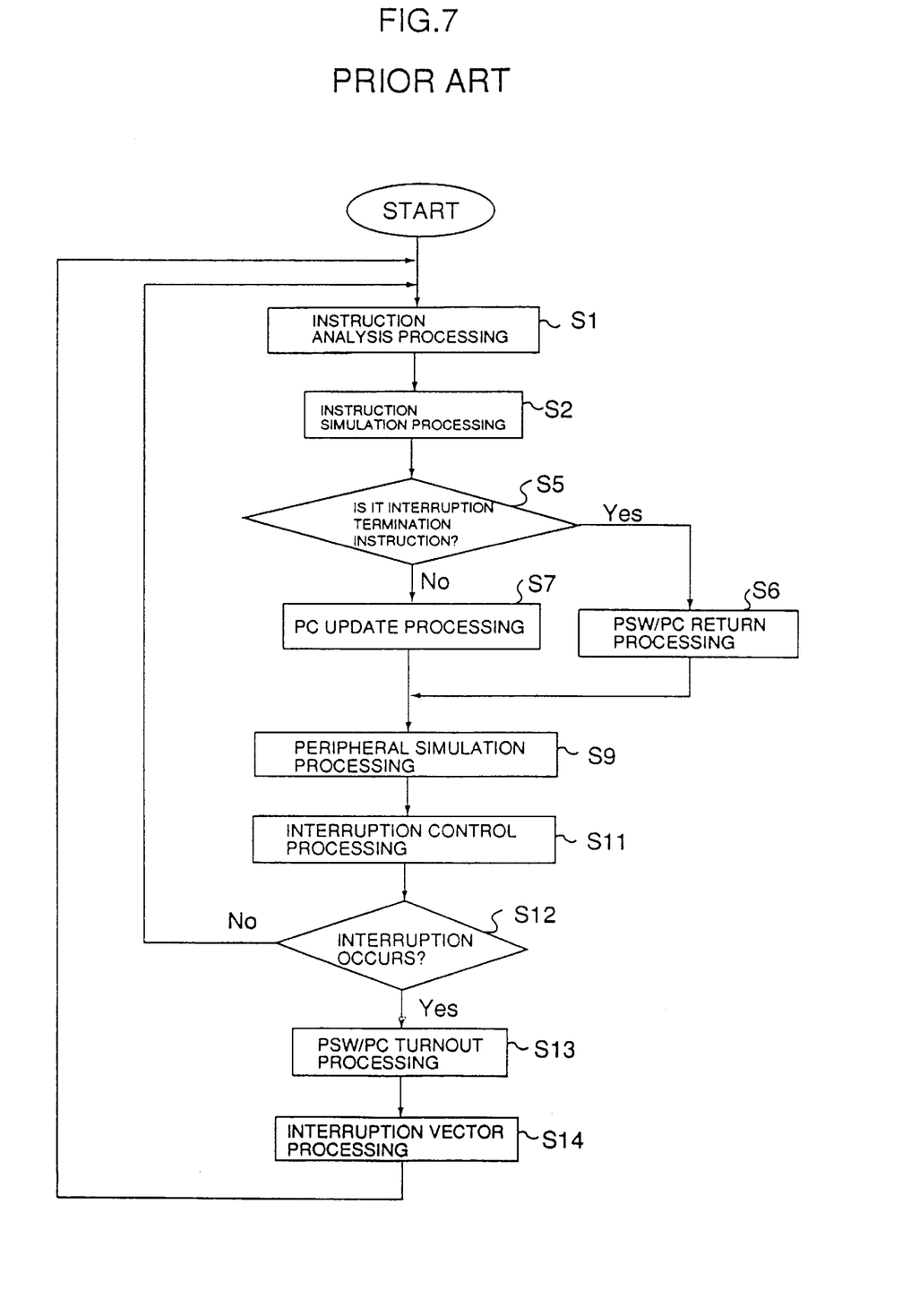
FIG. 7 is a flow chart showing the operation of the system of the prior art.

Conventionally, in the process for developing a computer program, a simulation system has been employed for the purpose of correcting detected logic errors on the program and inconformity to the outer conditions by simulating the computer programming. The prior art simulation system is described referring to FIG. 5 to FIG. 7. FIG. 5 shows a simulation procedure as the prior art. FIG. 6 is a block diagram of the simulation system as the prior art. FIG. 7 is a flow chart showing a series of operations of the prior art simulation system.

As FIG. 5 shows, in the conventional simulation procedure, one instruction written in machine language is simulated. After simulating the instruction, a peripheral processing program such as timer/serial is simulated for the number of clocks taken for simulating one instruction written in machine language. These operations are executed each one instruction written in machine language one by one. And also at the end of simulating the peripheral processing program, the interruption processing is executed. In FIG. 5, 7 instructions are simulating. This simulation is so set that an interruption occurs during execution of the instruction 4. Then four instructions are simulated as the interruption instruction.

In FIG. 5, the peripheral processing program is simulated after simulated an instruction 1. Then the peripheral processing program is simulated after simulating an instruction 2. The peripheral processing program is simulated after simulating an instruction 3. The peripheral processing program is further simulated after simulating an instruction 4. The interruption occurs during simulation of the instruction 4. Then the interruption is processed as well as simulating a series of interruption processing instructions.

After simulating the interruption processing instruction 1, the peripheral processing program is simulated. Then, after simulating the interruption processing instruction 2, the peripheral processing program is simulated. After simulating the interruption processing instruction 3, the peripheral processing program is simulated. Then after simulating the interruption processing instruction 4, the peripheral processing program is further simulated. Since the interruption processing instruction 4 represents an end instruction to terminate the interruption, the interruption processing is terminated and the program returns to the step of simulating instructions. After simulating the instruction 5, the peripheral processing program is simulated. After simulating the instruction 6, the peripheral processing program is simulated. After simulating the instruction 7, the peripheral processing program is simulated.

FIG. 6 shows a simulation system for realizing the above described conventional simulation method. FIG. 7 is a flow chart showing a series of operations of the system.

Referring to FIG. 7, an instruction analysis processing step (S1) analyzes the instruction read from an instruction input section 12, shown in FIG. 6, with an instruction analysis section 13. An instruction execution processing step (S2) simulates the instruction with an instruction execution section 14. At a processing step (S5) for judging whether the instruction indicates the end of interruption, when the instruction indicates the end of interruption, the program proceeds to a PSW/PC return processing step (S6). At the PSW/PC return processing step (S6), values of both PSW (Program Status Word) and PC (Program Counter) of a PSW/PC section 18 are returned from the stack. When it is determined that the instruction does not indicate the end of interruption, the program proceeds to a PC update processing step (S7) where the value of the PC of the PSW/PC section 18 is passed. Then a peripheral simulation processing step (S9) simulates a peripheral processing program with a peripheral simulation section 16. At the end of simulating the peripheral processing program, the program proceeds to an interruption control processing step (S11) where interruption is controlled with an interruption processing section 17. At a processing step (S12) for judging whether the interruption occurs, when the interruption occurs, the program proceeds to a PSW/PC return processing step (S13). At this step (S13), values of the P,SW and PC of the PSW/PC section 18 are stacked. Then at. an interruption vector processing step (S14), an interruption vector value is set in the PC. When it is determined that no interruption has occurred, the program returns to the instruction analysis processing step (S1) and repeats simulating the instruction. As aforementioned, the conventional simulation procedure and simulation system simulates the peripheral processing program at every execution of one instruction.

The conventional simulation procedure and simulation system calls the peripheral simulation section at every instruction written in machine language. As a result, the time for calling(accessing) of the peripheral simulation section reflects on a prolonged time for simulation.

SUMMARY OF THE INVENTION

It is an object of the present invention to solve the aforementioned problem.

It is another object of the present invention to provide a simulation art which allows accelerating the simulation processing speed.

It is still another object of the present invention to provide a simulation art which allows simplifying the simulation procedures.

The object of the present invention is achieved by a simulation method comprising:

test instruction simulation for simulating at least two test instructions sequentially and counting the number of clocks taken for simulating the at least two test instructions; and peripheral processing program simulation for simulating a peripheral processing program relating to the at least two test instructions for the number of clocks which has been counted at the test instruction simulation step after simulating the at least two test instructions.

The object of the present invention is achieved by a simulation system comprising:

test instruction simulation means for simulating at least two test instructions sequentially and counting the number of clocks taken for simulating the at least two test instructions; and peripheral processing program simulation means for simulating a peripheral processing program relating to the at least two instructions for the number of clocks counted by the test instruction simulation means after simulating the at least two instructions.

In the present invention, the simulation method and the simulation system, a group of a predetermined number of instructions written in machine language are collectively simulated. After simulating the group of instructions, the peripheral processing programs are also executed collectively. As a result, the frequency of calling the peripheral processing program is decreased, thus reducing the total calling time.

It is further preferable to have an arrangement allowing for external setting and changing of the number of the instructions executed collectively so that an instruction sequence of the higher language is not separated at a point other than the breakpoint.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

An embodiment of the present invention is described, referring to the drawings.

Figure 1:
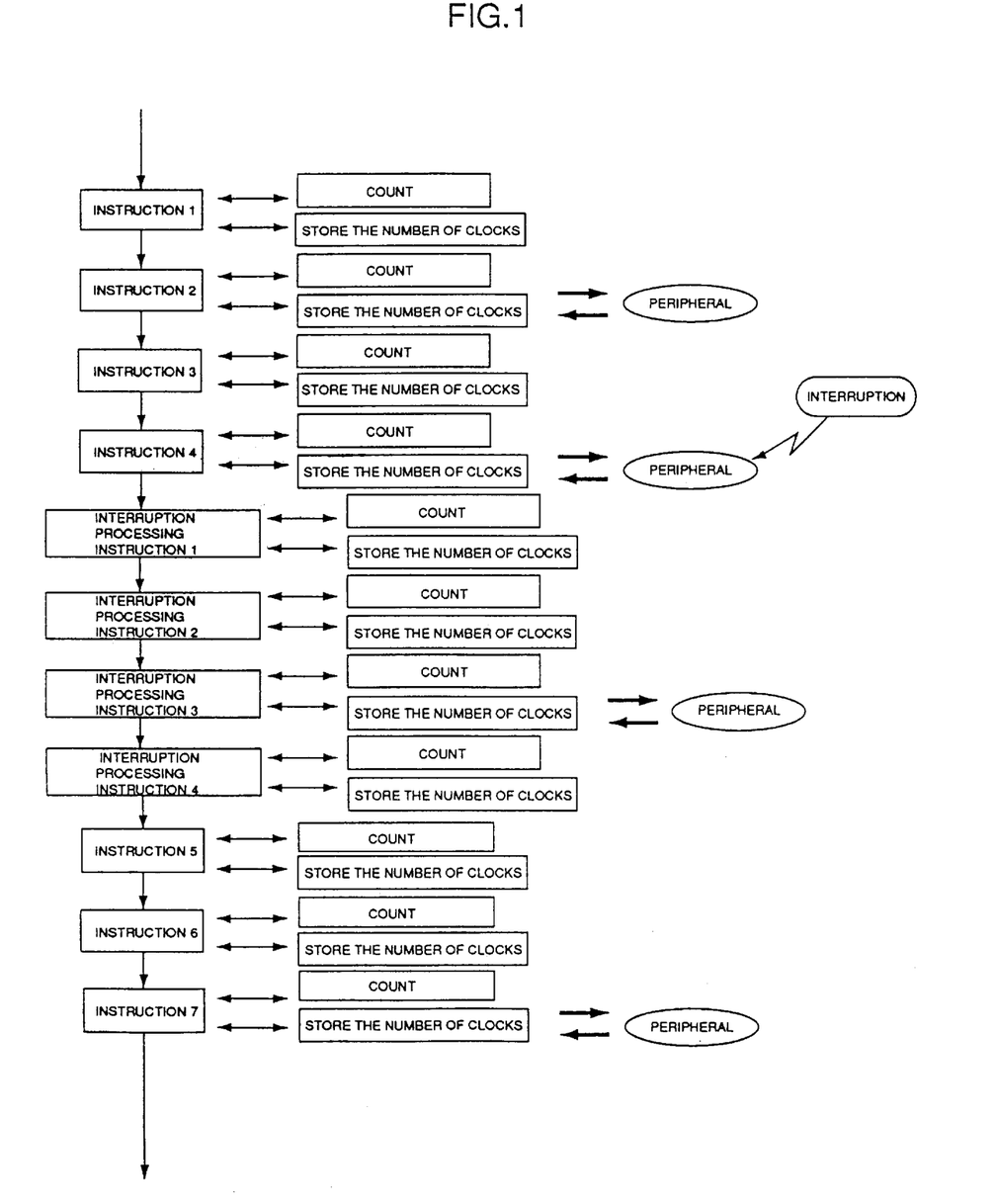
FIG. 1 is a flow chart showing a simulation method of the present invention.
Figure 2:
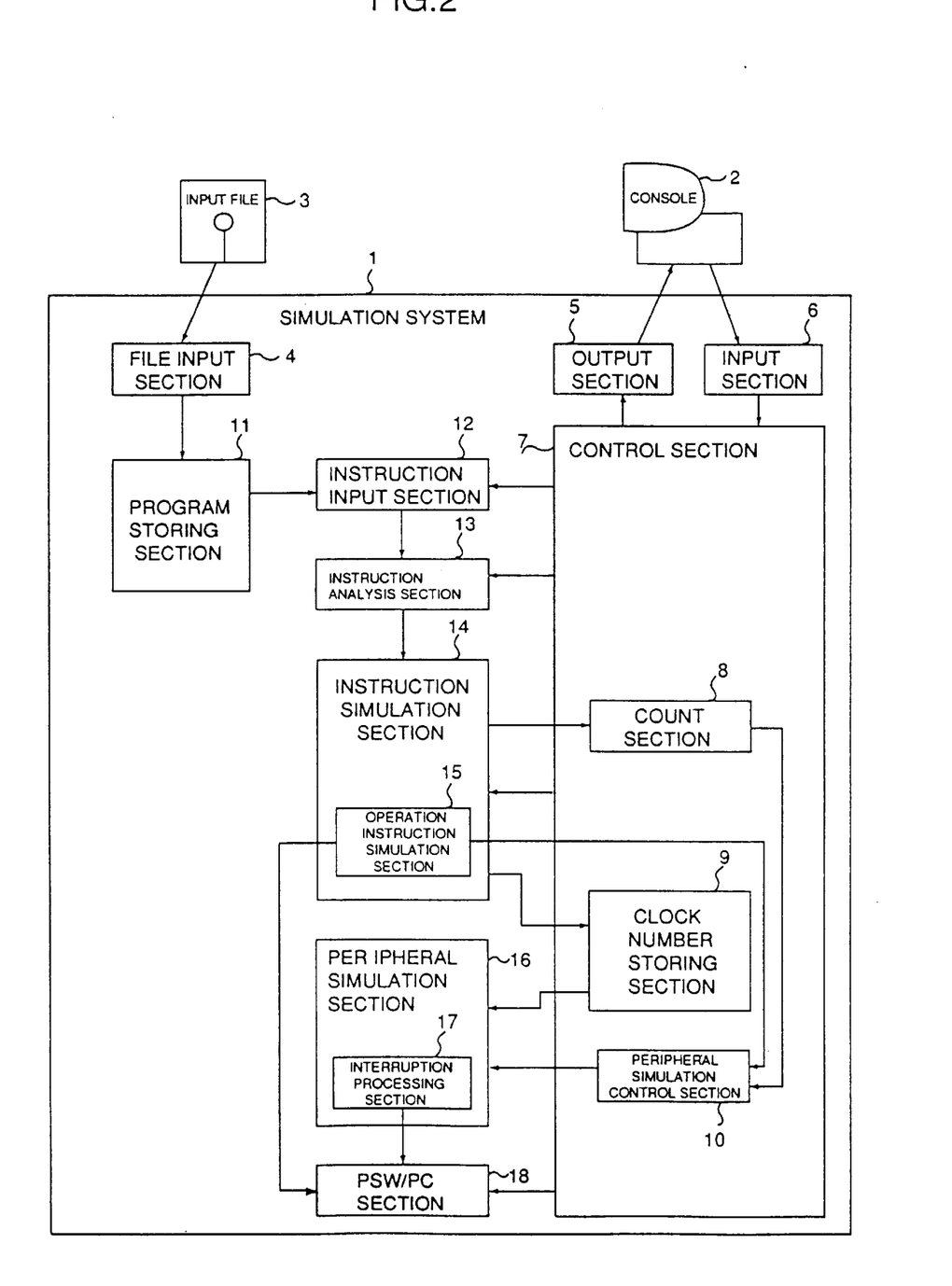
FIG. 2 is a block diagram of a system of the first embodiment.

The first embodiment of the present invention is described referring to FIG. 1 and FIG. 2. FIG. 1 is a flow chart showing a simulation method of the present invention. FIG. 2 is a block diagram of a system of the first embodiment of the present invention.

As shown in FIG. 1, the present invention is comprising: at least two different test instructions are individually simulated and the number of clocks required to simulate each instruction is stored; and the peripheral processing programs relevant to at least two different instructions are simulated once, for simulating the number of clocks taken for simulating at least two different test instructions.

FIG. 2 shows a schematic view of the system for realizing the simulation method of the present invention.

The system of the present invention comprises having a simulation unit 1, a console 2 and an input file 3.

The simulation unit 1 is provided with: an input section 6 for inputting information of simulation start-up instruction; a file input section 4 for inputting a test instruction; a program storing section 11 for retaining the inputted test instruction; an instruction input section 12 for readouting the instruction from the program storing section 11; an instruction analysis section 13 for analyzing the readoutted instruction; an instruction simulation section 14 for simulating the test instruction resulted from an analysis of the instruction analysis section 13; a peripheral simulation section 16 for simulating the peripheral processing program; an interruption processing section 17 for interruption simulating; and a PSW/PC section 18 for controlling values of PSW (Program Status Word) and PC (Program Counter).

The instruction simulation section 14 having an operation instruction simulation section 15 for simulating the test instruction relevant to the simulation of the peripheral processing program according to the instruction input.

A control section 7 is provided with: an execution instruction count section 8 for counting the number of simulated instructions; a clock number memory 9 for storing the number of clocks elapsed accompanied with the operation of the instruction execution section 14; and a peripheral simulation control section 10, in case the count value of the count section 83 exceeds the threshold value, for simulating the peripheral processing program for the number of clocks stored in the clock number memory 9 regardless of the absence or presence of the instruction input.

The control section 7 outputs the controlling result to an output section 5. The output section 5 outputs the controlling result of the control section 7 to a console 2.

Next, an operation of the simulation system of the present invention is explained.

For simplifying the explanation, the peripheral processing program is limited to the SFR (Special Function Register). The SFR operation Instruction represents to operate the flag within the micro computer so as to proceed the flow in the SFR.

As shown in FIG. 1, supposing that 7 instructions are simulated, the instructions 1, 3, 5 and 6 indicate not to operate the SFR and instructions 2, 4 and 7 indicate to operate the SFR. In case the peripheral processing program is simulated after simulating the instruction 4, then during the simulation of the peripheral processing program, the interruption occurs and 4 interruption instructions are simulated is explained. The interruption processing instructions 1, 2, 41 are instructions not to operate the SFR. The interruption processing instruction 3 is an instruction to operate the SFR. When the simulation starts, the instruction is simulated in a unit of a computer language source.

The operation instruction simulate section 15 simulates the instruction 1 and the count section 8 counts 1. The clock number memory section 9 counts the number of clocks taken for simulating the instruction 1, and is stored.

The instruction 2 is simulated and the count section 8 adds 1 count. The clock number memory section 9 counts the number of clocks taken for simulating the instruction 2, the count number is added to the stored number of clocks, and is stored.

Then a peripheral simulation control section 10 judges the instruction 2 is the operation instruction of the SFR, the peripheral simulation section 16 is called, which simulates the peripheral processing program for the number of clocks stored by the clock number memory section 9.

When the simulation of the peripheral processing program for the number of clocks terminates, the count section 8 and the clock number memory section 9 are reset to 0.

Sequentially, the operation instruction simulate section 15 simulates the instruction 3 and the count section 8 counts 1. The clock number memory section 9 counts the number of clocks taken for simulating the instruction 3, and is stored.

The instruction 4 is simulated and the count section 8 adds 1 count. The clock number memory section 9 counts the number of clocks taken for simulating the instruction 4, the count number is added to the stored number of clocks, and is stored.

Then a peripheral simulation control section 10 judges the instruction 4 is the operation instruction of the SFR, the peripheral simulation section 16 is called, which simulates the peripheral processing program for the number of clocks stored by the clock number memory section 9.

When the simulation of the peripheral processing program for the number of clocks terminates, the count section 8 and the clock number memory section 9 are reset to 0.

The interruption occurs during simulation of the peripheral processing program of the instruction 4. The program then proceeds to the interruption processing as well as simulating the interruption. The interruption processing instruction 1 is simulated and the count section 8 counts and stores the count number of the simulated instruction. The clock number memory 9 stores the number of clocks taken for simulating the instruction. Next, the interruption processing instruction 2 is simulated and the count section 8 adds 1 count. The clock number memory 9 counts the number of clocks taken for simulating the instruction, is added to the stored number of clocks and is stored.

The interruption processing instruction 3 is simulated and the count section 8 adds 1 count. The clock number memory section 9 counts the number of clocks taken for simulating the interruption processing instruction 3, the count number is added to the stored number of clocks and is stored.

The interruption processing instruction 3 is the operation instruction of the SFR, the peripheral simulation section 16 is called, which simulates the peripheral processing program for the number of clocks stored by the clock number memory section 9.

When the simulation of the peripheral processing program for the number of clocks terminates the count section 8 and the clock number memory section 9 are reset to 0.

The interruption processing instruction 4 is further simulated and the count section 8 adds 1 count. The clock number memory section 9 counts the number of clocks taken for simulating the instruction, and stores the number of count.

Since the interruption processing instruction 4 indicates to terminate the interruption, the interruption processing is terminated and the program returns to the step for executing the instruction. The instruction 5 is simulated and the count section 8 adds 1 count. The clock number memory section 9 counts the number of clocks taken for simulating the instruction 5, the count number is added to the stored number of clocks and is stored.

The instruction 6 is simulated and the count section 8 adds 1 count. The clock number memory section 9 counts the number of clocks taken for simulating the instruction 6, the count number is added to the stored number of clocks and is stored.

The instruction 7 is simulated and the count section 8 adds 1 count. The clock number memory section 9 counts the number of clocks taken for simulating the instruction 7, the count number is added to the stored number of clocks and is stored.

Then a peripheral simulation control section 10 judges the instruction 7 is the operation instruction of the SFR, the peripheral simulation section 16 is called, which simulates the peripheral processing program for the number of clocks stored by the clock number memory section 9.

As described above, the count section 8 stores the instruction not to operate the SFR is executed, the clock number memory 9 registers the number of clocks elapsed accompanied with the execution of the instruction at the same time. The program then proceeds to execute the next instruction. An another instruction is simulated repeatedly in the same manner.

While repeatedly simulating the instruction, simulate the instruction requiring access to the peripheral simulation section 16 as for the instruction operating the SFR, the program does not proceed to the step for simulating the next instruction, but calls the peripheral simulation section 16. The peripheral processing program is simulated for the number of clocks stored in the clock number memory section 9.

When the count number of the simulated instruction exceeds a predetermined value during simulation of the instruction, the peripheral simulation section 16 is actuated for processing. This is intended to prevent a group of interruptions from occurring at a time of collective simulation of the peripheral processing programs resulted from an unnecessarily large number of clocks.

When the interruption occurs during the processing of the peripheral simulation section 16, it is checked which interruption occurs prior to proceeding the step for simulating the instruction after the processing of the peripheral simulation section 16 has been terminated.

Figure 3:
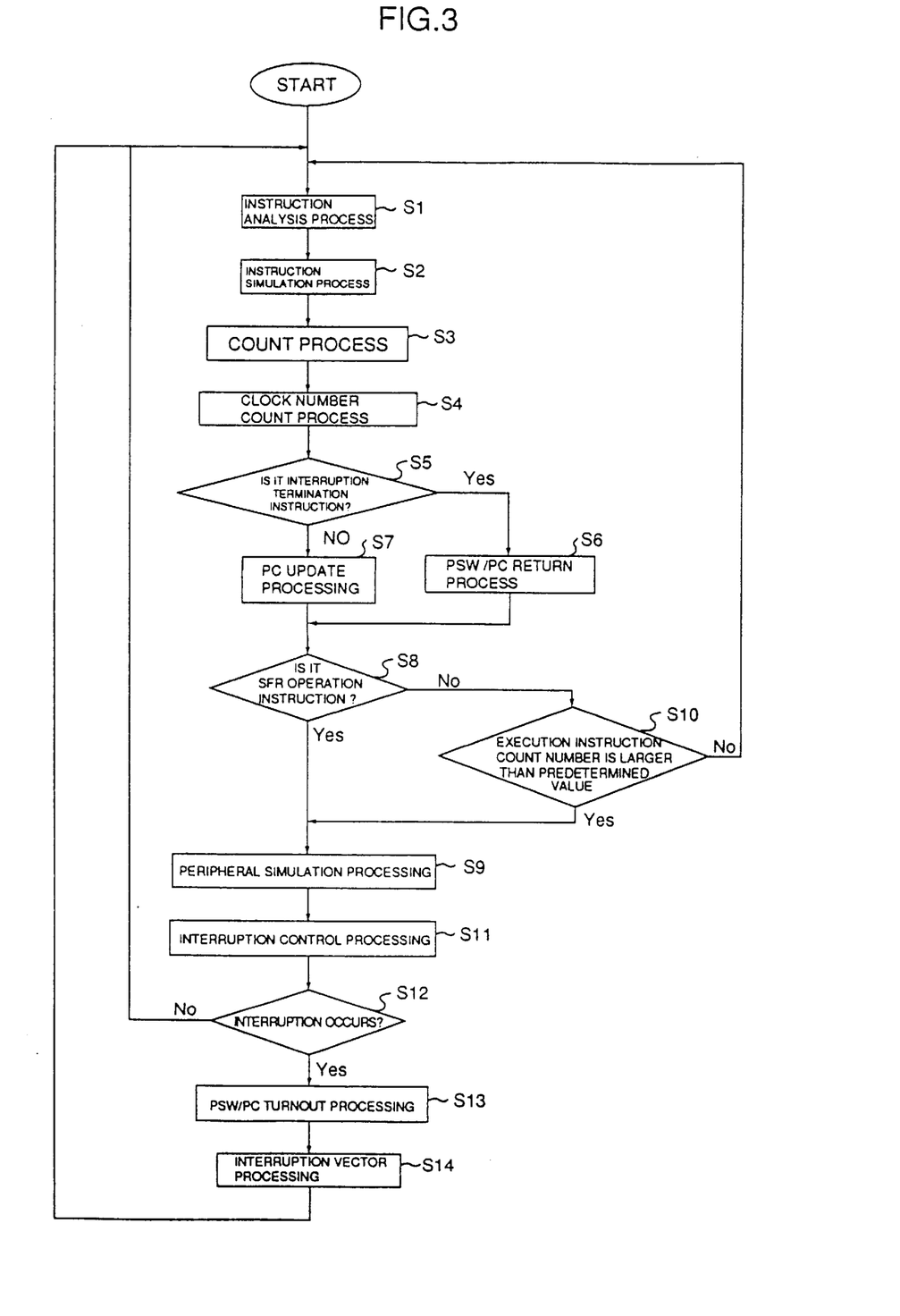
FIG. 3 is a flow chart showing the operation of the system of the first embodiment of the present invention.

FIG. 3 is a flow chart showing the operation of the system of the first embodiment of the present invention.

An instruction analysis processing step (S1) analyzes the instruction read from the instruction input section 12 in the instruction analysis section 13. The information of the resultant analysis is sent to an instruction simulation processing step (S2) where the instruction is simulated.

A count processing step (S3) counts the number of simulated instruction with the count section 8. A clock count processing step (S4) stores the number of clocks taken for simulating the instruction in the clock number count section 9. A processing step (S5) judges whether the instruction indicates to terminate the interruption. When the instruction indicates to terminate the interruption, values of PSW and PC of the PSW/PC section 18 are returned from the stack at a PSW/PC return processing step (S6). When it is determined that the instruction does not indicate to terminate the interruption, the PC value of the PSW/PC section 18 is passed. A processing step (S8) judges whether or not the instruction indicates to operate the SFR. When it is determined to operate the SFR, the program proceeds to a processing step (S9) where the peripheral processing program is simulated in the peripheral simulation section 16.

When it is determined not to operate instruction of the SFR, the program proceeds to a processing step (S10) where it is judged whether the count number of the simulated instruction is larger than a predetermined value of the count number of the count section 8. When the count number of the count section 8 which has been checked exceeds the predetermined value, the program proceeds to a peripheral simulation processing step (S9) where the peripheral processing program is simulated in the peripheral simulation section 16. When the count number of the simulated instruction is less than the predetermined value, the program returns to the instruction analysis processing step (S1) to repeat simulating the instruction.

An interruption control processing step (S11) is simulated in the interruption processing section 17 at the end of simulating the peripheral processing program. A processing step (S12) judges whether or not the interruption occurs. When it is determined that the interruption has occurred, the program proceeds to a PSW/PC turnout processing step (S13) where values of PSW and PC of the PSW/PC section 18 are piled on the stack.

Then at a vector processing step (S14), the interruption vector value is set in the PC. When it is determined that the interruption has not occurred, the program returns to the instruction analysis processing step (S1) and repeats simulating the instruction.

Figure 4:
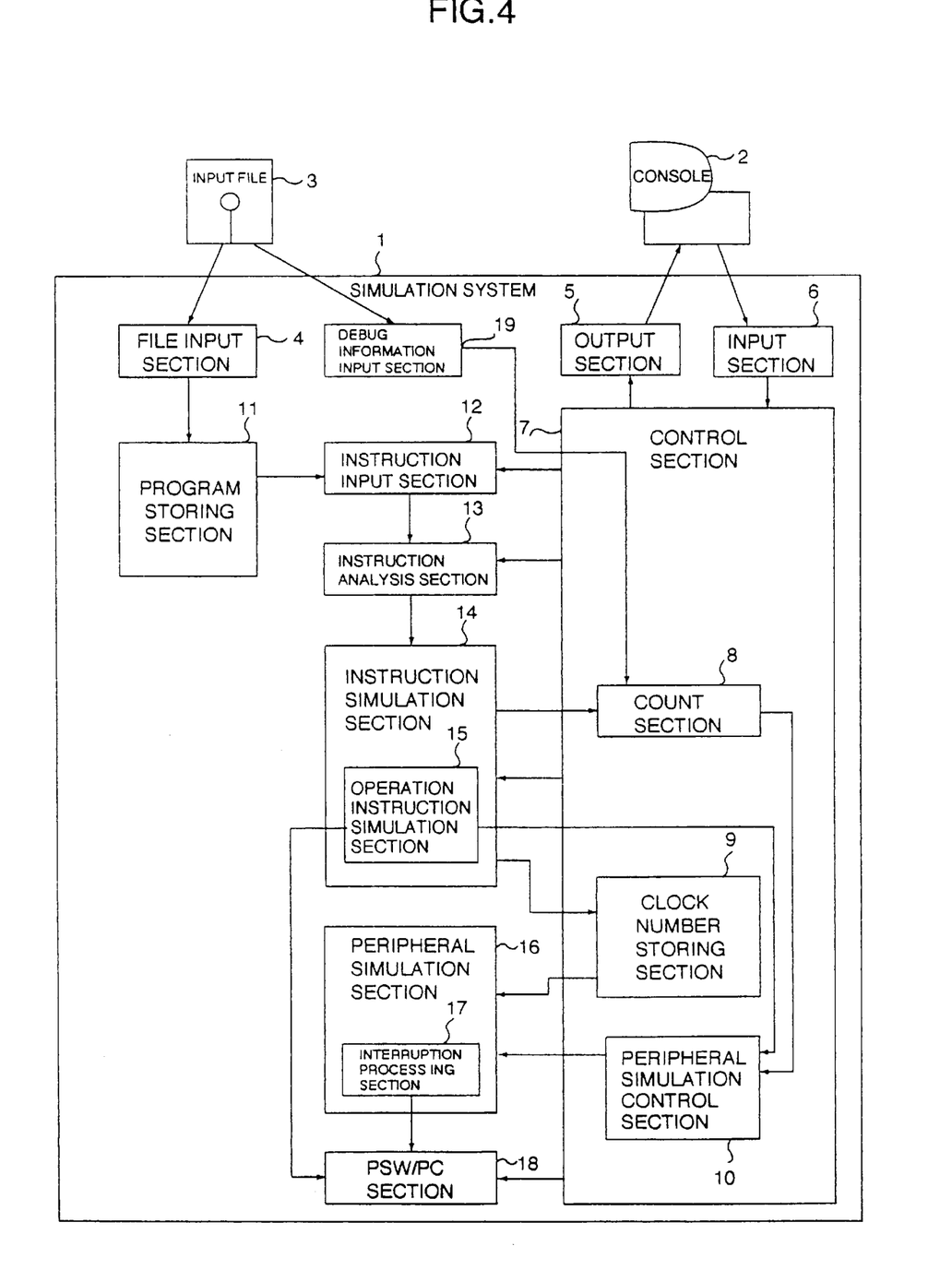
FIG. 4 is a block diagram of a system of the second embodiment.

Referring to FIG. 4, a second embodiment of the present invention is described by giving an example of simulating the peripheral processing program at every one sequence of the higher language by inputting debug information from the input file. FIG. 4 is a block diagram of the system of the second embodiment of the present invention.

In the first embodiment of the present invention, supposing that the instruction other than the SFR operation instruction is simulated sequentially, the peripheral processing program is simulated only when the count number of the simulated instruction exceeds the set value.

This method takes no consideration on the breakpoint of a plurality of mechanical instructions when simulating one sequence of the higher language.

Therefore the peripheral processing program cannot be simulated correctly with the method for simulating in unit of one sequence of the higher language. In order to overcome the above drawback, a debug information input section 19 for inputting the debug information from the input file 3 is provided. In case the instruction indicates not to operate the SFR during the simulation of the instruction, the count number of the simulated instruction is compared with the number of mechanical instruction corresponding to one sequence of the higher language by observing the information of the debug information input section 19. When the count number of the simulated instruction conforms to the number of the mechanical instructions, the peripheral processing program is simulated with the peripheral simulation section 16. The method of the present invention allows the peripheral processing program in unit of one sequence of the higher language to be correctly simulated.

As aforementioned, the present invention reduces the frequency of the call to the peripheral simulation section compared to the prior art by processing a plurality of mechanical instructions with the peripheral simulation sections collectively. In case of a large number of instructions to operate the SFR, the method is considered to be similar to that of the prior art. About 15% of the instruction sets incorporated in the micro computer is the instruction to operate the SFR. Therefore the frequency of calling to the peripheral simulation section will be reduced by using the present invention. This reflects an acceleration effects on the processing speed. The peripheral simulation section may be incorporated into the simulation program as the dynamic link library. However calling the dynamic library requires a long time. The present invention reflects great effects on the processing when using the dynamic link library.

What is claimed is:

1. A simulation method comprising the steps of:
   simulating at least two test instructions sequentially;
   counting a respective number of clock cycles taken for simulating each of said at least two test instructions; and then
   simulating a peripheral processing program relating to said at least two test instructions for a total number of clock cycles taken for said at least two test instructions;
   detecting an interruption during simulation of said peripheral processing program; then
   sequentially simulating at least two interruption processing instructions relating to said interruption;
   counting a number of clock cycles taken for simulating said at least two interruption processing instructions;
   adding up said number of clock cycles taken for simulating said at least two interruption processing instructions to provide a total interruption clock cycles number; storing said total interruption clock cycles number; and then
   simulating said peripheral processing program relating to said at least two interruption processing instructions for said total interruption clock cycles number.

2. A simulation method comprising steps of:
   simulating a test instruction and counting the number of clock cycles for simulating said test instruction; then
   adding up counted numbers of clock cycles sequentially and storing the number of clock cycles taken for executing at least two test instructions;
   counting the number of executed test instructions;
   judging whether a predetermined test instruction has been simulated; and
   simulating a peripheral processing program relating to said at least two test instructions for the number of clock cycles stored in said memory step upon the occurrence of the earlier of:
      said judgment indicating that predetermined test instruction has been simulated, and
      said number of executed test instructions reaching a predetermined value;
   simulating an interruption processing instruction after completing simulation of said peripheral processing program and counting the number of clock cycles taken for simulating said interruption processing instruction in case an interruption occurs during simulation of said peripheral processing program;
   adding up counted numbers of clock cycles sequentially and storing the number of clock cycles required for executing at least two test instructions; and
   simulating said peripheral processing program relating to said at least two interruption processing instructions for the number of clock cycles stored in said memory step after simulating said at least two interruption processing.

3. A simulation system comprising:
   test instruction simulation means for simulating at least two test instructions sequentially and counting the number of clock cycles taken for simulating said at least two test instructions; and
   peripheral processing program simulation means for simulating a peripheral processing program relating to said at least two instructions for the number of clock cycles counted by said test instruction simulation means after simulating said at least two instructions;
   interruption processing simulation means for sequentially simulating at least two interruption processing instructions in synchronization with clock signals and for counting the number of clock cycles taken for simulating said at least two interruption processing instructions;
   means for simulating said peripheral processing program, relating to said at least two interruption processing instructions, for the number of clock cycles counted by said interruption processing instruction simulation means and for and simulating said peripheral processing program when an interruption occurs during simulation of said peripheral processing program; and
   means for controlling respective values of a program status word and a program counter.

4. A simulation system comprising:
   file input means for inputting a test program;
   program storing means for storing an input test program;

read means for reading said test program from said program storing section;

analysis means for analyzing a test instruction intended for simulation based on said test program which has been read;

simulating means for simulating the test instruction analyzed by said analysis means synchronized with clock signals;

storing means for counting the numbers of clock cycles required for simulating said test instructions sequentially and storing the number of clock cycles taken for simulating at least two test instructions;

count means for counting the number of simulated test instructions; and simulating means for simulating a peripheral processing program for the number of clock cycles stored in said storing means in case the number of count of said count means reaches a predetermined value or a predetermined test instruction has been simulated;

interruption processing instruction simulation means for sequentially simulating at least two interruption processing instructions in synchronization with clock signals and for counting the number of clock cycles taken for simulating said at least two interruption processing instructions;

means for collectively simulating said peripheral processing program relating to said at least two interruption processing instructions once for the number of clock cycles counted by said interruption processing instruction simulation means; and means for controlling respective values of a program status word and a program counter.

* * * * *